United States Patent
Worthy et al.

(10) Patent No.: US 11,390,164 B2
(45) Date of Patent: Jul. 19, 2022

(54) VEHICLE INTERFACE HAVING ELECTROMAGNETIC COMMUNICATIONS

(71) Applicant: Ford Global Technologies, LLC, Dearborn, MI (US)

(72) Inventors: Stephenie Worthy, Westland, MI (US); Grant Inskeep, Royal Oak, MI (US); Erick Michael Lavoie, Dearborn, MI (US); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 16/168,323

(22) Filed: Oct. 23, 2018

(65) Prior Publication Data

US 2020/0122576 A1 Apr. 23, 2020

(51) Int. Cl.
*B60K 35/00* (2006.01)

(52) U.S. Cl.
CPC ........ *B60K 35/00* (2013.01); *B60K 2370/145* (2019.05); *B60K 2370/152* (2019.05); *B60K 2370/161* (2019.05); *B60K 2370/589* (2019.05); *B60K 2370/782* (2019.05)

(58) Field of Classification Search
CPC .............. B60K 35/00; B60K 2370/145; B60K 2370/152; B60K 2370/161; B60K 2370/589; B60K 2370/782; B60K 2370/566
See application file for complete search history.

(56) References Cited

U.S. PATENT DOCUMENTS

| | | | |
|---|---|---|---|
| 8,385,971 B2 | 2/2013 | Rhoads et al. | |
| 8,793,034 B2 | 7/2014 | Ricci | |
| 2015/0373433 A1* | 12/2015 | McLaren | H04Q 11/0071 398/49 |
| 2016/0061935 A1* | 3/2016 | McCloskey | G01S 7/0234 342/82 |
| 2017/0085126 A1* | 3/2017 | Leabman | H02J 50/00 |
| 2017/0099295 A1* | 4/2017 | Ricci | G01C 21/3697 |

(Continued)

FOREIGN PATENT DOCUMENTS

| | | | |
|---|---|---|---|
| JP | 4536300 B2 * | 9/2010 | |
| WO | WO-2017049923 A1 * | 3/2017 | ......... H04N 5/23212 |

OTHER PUBLICATIONS

N. Rajagopal, P. Lazik and A. Rowe, Visual light landmarks for mobile devices, IPSN-14 Proceedings of the 13th International Symposium on Information Processing in Sensor Networks, Berlin, 2014, pp. 249-260, doi 10.1109IPSN.2014.6846757. https://ieeexplore.ieee.org/document/6846757 (Year: 2014).*

(Continued)

*Primary Examiner* — Donald J Wallace
*Assistant Examiner* — Daniel M. Robert
(74) *Attorney, Agent, or Firm* — Gregory P Brown; Brooks Kushman P.C.

(57) ABSTRACT

A vehicle includes an interface having an electromagnetic transmitter and operable to receive tactile user input for control of a system of the vehicle. The vehicle includes a controller configured to modulate output having ultraviolet or infrared spectrum wavelength of the electromagnetic transmitter at a receiver capture rate to encode data into the output describing the control interface. The modulated output is responsive to a request.

10 Claims, 4 Drawing Sheets

(56) References Cited

U.S. PATENT DOCUMENTS

| | | | | |
|---|---|---|---|---|
| 2017/0149946 A1* | 5/2017 | Buttolo | .............. | H04M 1/6091 |
| 2017/0366276 A1* | 12/2017 | Aveline | ................ | H04B 10/691 |
| 2020/0153506 A1* | 5/2020 | Linnartz | ............. | H04B 10/116 |
| 2020/0204256 A1* | 6/2020 | Arulandu | ............. | H04B 10/116 |

OTHER PUBLICATIONS

Harald Haas, "LiFi is a paradigm-shifting 5G technology," Reviews in Physics 3 (2018) 26-31, published online on Oct. 27, 2017 at: https://doi.org/10.1016/j.revip.2017.10.001. (Year: 2017).*

Harald Haas, "LiFi: Transforming Fibre into Wireless," (YouTube video), uploaded on Feb. 14, 2017 by user "SPIETV,". Retrieved from Internet on Feb. 1, 2021: https://www.youtube.com/watch?v=Dp34aH5D-RA. (Year: 2017).*

Harald Haas, "Forget Wi-Fi. Meet the new Li-Fi Internet/ Harald Haas," (YouTube video), uploaded on Dec. 2, 2015 by user"TED,". Retrieved from Internet on Feb. 1, 2021: https://www.youtube.com/watch?v=iHWIZsIBj3Q. (Year: 2015).*

I. Takai, S. Ito, K. Yasutomi, K. Kagawa, M. Andoh and S. Kawahito, "LED and CMOS Image Sensor Based Optical Wireless Communication System for Automotive Applications," in IEEE Photonics Journal, vol. 5, No. 5, p. 6801418-6801418, Oct. 2013, Art No. 6801418, doi: 10.1109/JPHOT.2013.2277881. (Year: 2013).*

\* cited by examiner

VEHICLE INTERFACE HAVING ELECTROMAGNETIC COMMUNICATIONS

TECHNICAL FIELD

This disclosure relates to vehicle interfaces having electromagnetic communications.

BACKGROUND

Vehicle interfaces enable occupant interaction with vehicle systems and components. Expanding vehicle capabilities increase interface complexity and abundance, leaving occupants uncertain of vehicle interface functions. Mobile devices may provide occupants with interface definitions and functionality. Such methods, however, may require ambient light and proper orientation to provide interface definitions and functionality.

SUMMARY

A vehicle includes an interface having an electromagnetic transmitter and is operable to receive tactile user input for control of a system of the vehicle. The vehicle includes a controller configured to modulate output having ultraviolet or infrared spectrum wavelength of the electromagnetic transmitter at a receiver capture rate to encode data into the output describing the control interface. The modulated output is responsive to a request.

A method by a controller includes displaying, on a graphical user interface, information related to a control interface based on an identification of the control interface such that operation of the control interface is disclosed. The display is responsive to receiving an electromagnetic output being modulated according to a capture rate of a sensor having a wavelength within an ultraviolet or an infrared spectrum defining a data stream with the identification associated with a transmitter of the electromagnetic output.

A method by a controller includes displaying, on a graphical user interface, information based on an identification of a control interface related to a one of a plurality of electromagnetic outputs having a greatest intensity and such that operation of the control interface is disclosed. The display being responsive to receiving a plurality of electromagnetic outputs modulated according to a capture rate of a sensor having a wavelength within an ultraviolet or an infrared spectrum defining a data stream with the identification of control interface associated with respective transmitters of the electromagnetic outputs.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Occupants interact with vehicle systems through vehicle interfaces. Any vehicle type is contemplated through this disclosure. For example, vehicles may enable travel on land, sea, air, and space. Vehicles may include automobiles, cars, trucks, boats, ships, planes, helicopters, drones, or remote controllers. An interface may enable any type of human-machine interaction. For example, interfaces may be push buttons, pull buttons, knobs, dials, indicators, touchscreens, switches. Such interfaces may include electromagnetic transmitters. The electromagnetic transmitters may output modulated signals to be read by a sensor having a rolling shutter. For example, a CMOS sensor of a mobile phone may have a rolling shutter. A rolling shutter may be a modular sensing apparatus of various types. That is, the rolling shutter may be arranged to sense by columns, rows, or other arbitrary segment to systematically or sequentially read electromagnetic signals received by the sensor to form a full frame of the camera. Indeed, electromagnetic communications from each interface may be read by a mobile phone of a vehicle occupant to provide information relating to the functions and operation of the interface.

Figure 1:
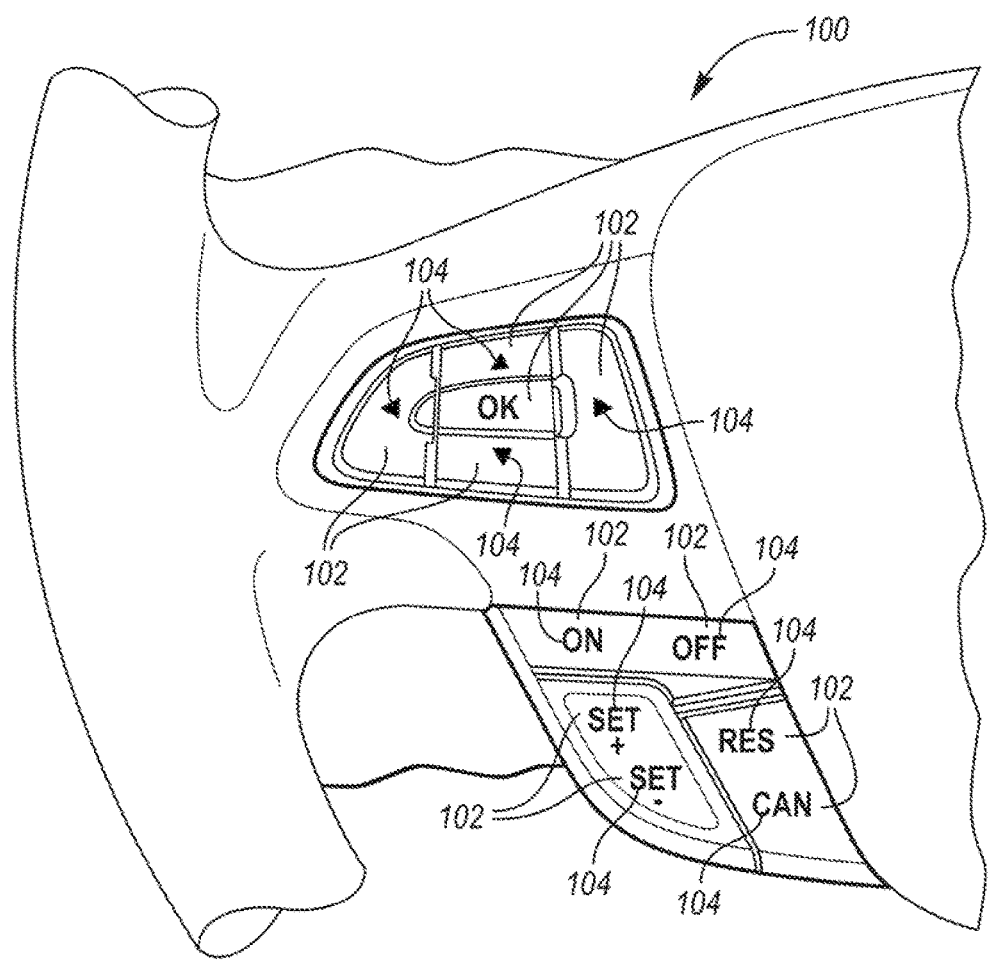
FIG. 1 is a plan view of a vehicle and associated interfaces.

Referring to FIG. 1, a vehicle 100, or portion thereof, is shown. Interfaces 102 may be disposed on the portion of the vehicle 100. For example, a steering wheel of a vehicle is shown having a plurality of interfaces 102. The interfaces 102 may provide any type of human-machine interaction and are not limited to push buttons that provide tactile input. For example, the interfaces 102 may be a touchscreen display or graphical user interfaces therein. The interfaces 102 may be located on any portion of the vehicle including external or internal locations. The interfaces 102 may be located in the trunk or engine compartment.

Figure 2:
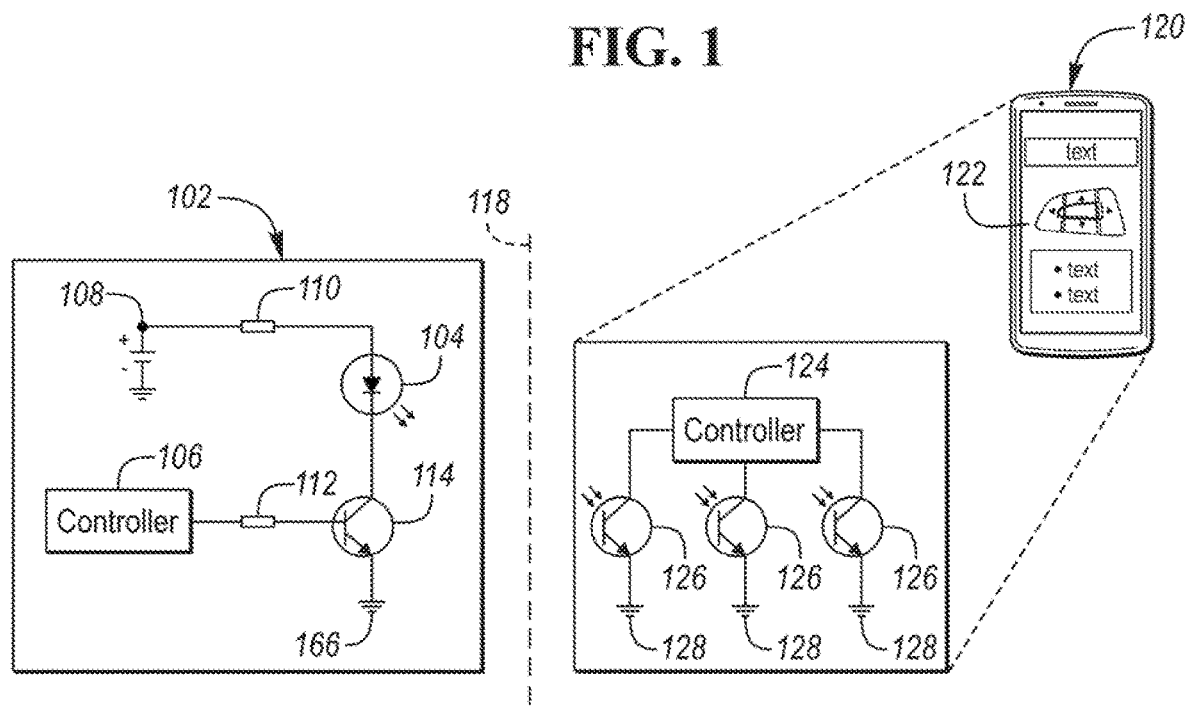
FIG. 2 is a schematic view of an interface and a mobile device.

The interfaces 102 may include electromagnetic transmitters 104. The electromagnetic transmitter 104 may emit any type of electromagnetic output. The electromagnetic output may be within the ultraviolet or infrared spectrum. For example, the electromagnetic output may be in the visible light spectrum. Meaning, the electromagnetic transmitter may be a light-emitting diode (LED) as shown in FIG. 2. The electromagnetic output may also be within the ultraviolet and infrared spectrum but unperceivable to the human eye. For example, the electromagnetic output may be outside of the visible light range but fall within the ultraviolet and infrared spectrum. Such an implementation would allow communication between the transmitter 104 and the CMOS sensor without distracting vehicle occupants.

Referring to FIG. 2, a schematic diagram of the interface 102 and a mobile or nomadic device 120 is shown. The interface 102 includes an electromagnetic transmitter 104.

The electromagnetic transmitter 104 is shown as an LED but may be another type of transmitter. The transmitter 104 is driven by a DC source 108 and a resistor 110. The transmitter 104 is controlled by a controller 106. The controller is connected to a resistor 112 and a transistor 114 to control the flow of current through the transmitter 104. The output of the transmitter 104 may be modulated to indicate digital information and the digital information may be encoded according to known methods. The output of the transmitter 104 may be modulated according to the rolling shutter rate or speed of the CMOS sensor 126 of the mobile device. For example, the modulation timing may be synchronized with the rolling shutter speed—e.g., receiving capture rate—of the CMOS sensor 126.

As shown in a simplified diagram, the rolling shutter of the CMOS sensor 126 is operated by a controller 124 to read each sensing segment or transistor of the CMOS sensor 126 systematically. For example, the controller 124 may sequentially take readings from the sensors 126 at 1 μs intervals 302 as shown in FIG. 3.

Figure 4:
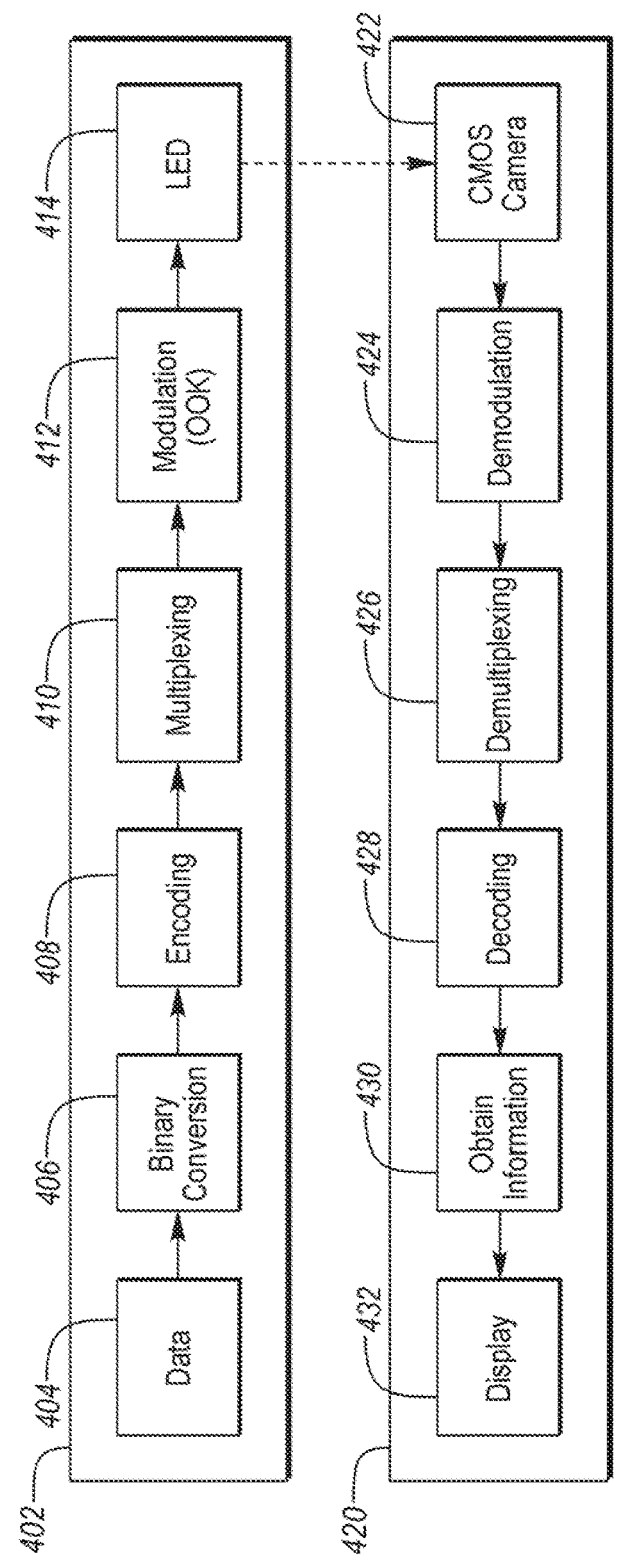
FIG. 4 is an algorithm for displaying interface information from an electromagnetic transmitter.

The sequential readings may be subsequently stitched together forming a full picture frame. The modulation rate of the modulated output 304 of the transmitter 104 is matched to the rolling shutter rate or receiver capture rate of the collective CMOS sensor 126. As shown in FIG. 4 the information received by the controller 124 of the mobile device 120 is used to display reference materials related to the interface 102 to occupants of the vehicle. The mobile device 120 may request further information from servers or database infrastructure outside of the mobile device 120. The mobile device 120 may have a datastore or other database stored in local memory for retrieval. The reference materials on the display 122 may include diagrams, text, pictures, videos, or other information to assist occupants with the use of each interface 102 or vehicle systems. Additionally, the entire received image from the CMOS sensor 126 may be stitched together and displayed on the mobile device display 122. Indeed, a captured image of the interface 102 may also include identification or reference materials related to the interface 102 without requiring object recognition of the image.

Figure 3:
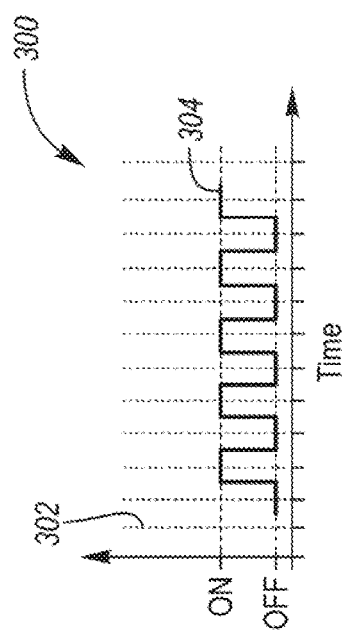
FIG. 3 is a graph of a rolling shutter and a received electromagnetic signal.

Referring to FIGS. 3 and 4. FIG. 3 depicts a graph 300 having a modulated output 304 and a rolling shutter 302 reading such output at predetermined intervals. The modulated output may be a digital output having a Manchester encoding and an ON-OFF keyed modulation scheme.

FIG. 4 shows a communications algorithm 400 for generating the modulated output 304 and reading information therein. Controller 106 operations 402 are shown alongside controller 124 operations 420. Data 404 associated with the interface may be embedded in any type of memory ready by or included with the controller 106. The controller 106 reads data and converts it to binary in step 406. The binary data 406 is encoded by the controller 106. The encoding may be any known in the art (e.g., Manchester).

In some circumstances the encoded data may be multiplexed 410 to increase communication rates or improve reliability. The multiplexing 410 may include associating portions of the encoding 408 with colors or wavelengths of a cluster of transmitters 104. For example, multiple transmitters 104 may be configured to transmit within predetermined wavelengths. The combination of received colors along a column, row, or arbitrary segment of CMOS sensor 126 may provide increase bandwidth or data validation. That is, a column of CMOS sensors falling within an individual frame of the rolling shutter may detect a plurality of distinct wavelengths or colors related to distinct data streams. After multiplexing, the controller 106 modulates output of the transmitter 104 or plurality of transmitters 104 according to the receive capture rate or rolling shutter of the CMOS sensor 126. The modulation type may be ON-OFF keyed (OOK).

The output 304 is received and processed by the controller 124 and CMOS sensor 126 according to a rolling shutter of the CMOS sensor 126 such that the CMOS camera sensor 422 collects the modulated signal. A rolling shutter 302 is defined as systematically reading any arbitrary segment of CMOS sensor 126. For example, a column-based rolling shutter may read CMOS pixels aligned in columns of the frame from left to right. A row-based rolling shutter may read CMOS pixels aligned in rows of the frame from top to bottom. Any other systematic selection of pixels may be used.

The modulated output 304 is demodulated by virtue of the rolling shutter 424. That is, the synchronization of the rolling shutter to the modulation frequency enables accurate transmission of data by detecting digital electromagnetic or light values as each segment of the CMOS sensor 126 is read. As such, each segment of the CMOS sensor 126 may provide data in spite of the entire image frame being unread.

After receipt of the demodulated data via the rolling shutter 302, the data may be demultiplexed by recognition of particular light or electromagnetic values received. That is, if coloration of the pixels is used to provide multiplexing, data streams may be identified by colorations or wavelengths. Additionally, where the CMOS sensor could also detect multiple pixels in the segment having the same wavelength or color, the CMOS may use values from pixels having the highest intensity or magnitude. That is, with all other factors being equal, the controller 124 may associate the desired data stream with a particular section of the CMOS segment being read such that the most intense or section having the highest magnitude is used. For example, if a columnar CMOS segment of the rolling shutter is read, a top section may have a higher magnitude (e.g., average value value) of light than a bottom section of the segment. As such, the controller 124 would read the data stream from the top section of the segment for the remainder of the frame of picture taking period to ensure that demultiplexed data was from the same source transmitter 104 if multiple transmitters 104 are detected.

The received data is decoded 428 according to the encoding specified above. The controller 124 may then obtain information according to the data or display the data itself on a display 122 of the mobile device 120. The controller 124 may send the data offboard the mobile device to obtain the information. Further, the controller 124 may send the data to the vehicle 100 for a response. Meaning, the vehicle itself contains information related to the interfaces 102 and can provide information to the mobile device 120 upon presentation of an identifier in the data or other information. Further, the vehicle 100 may convey the information on a visual or audio interface at the request of the mobile device. The mobile device 120 may convey the information visually or aurally in step 432. A vehicle interface 102 may communicate with a CMOS camera sensor 126 of a mobile device 120 through a rolling shutter of the CMOS camera sensor 126 to provide directionally-based information requests from occupants of the vehicle.

Figure 5:
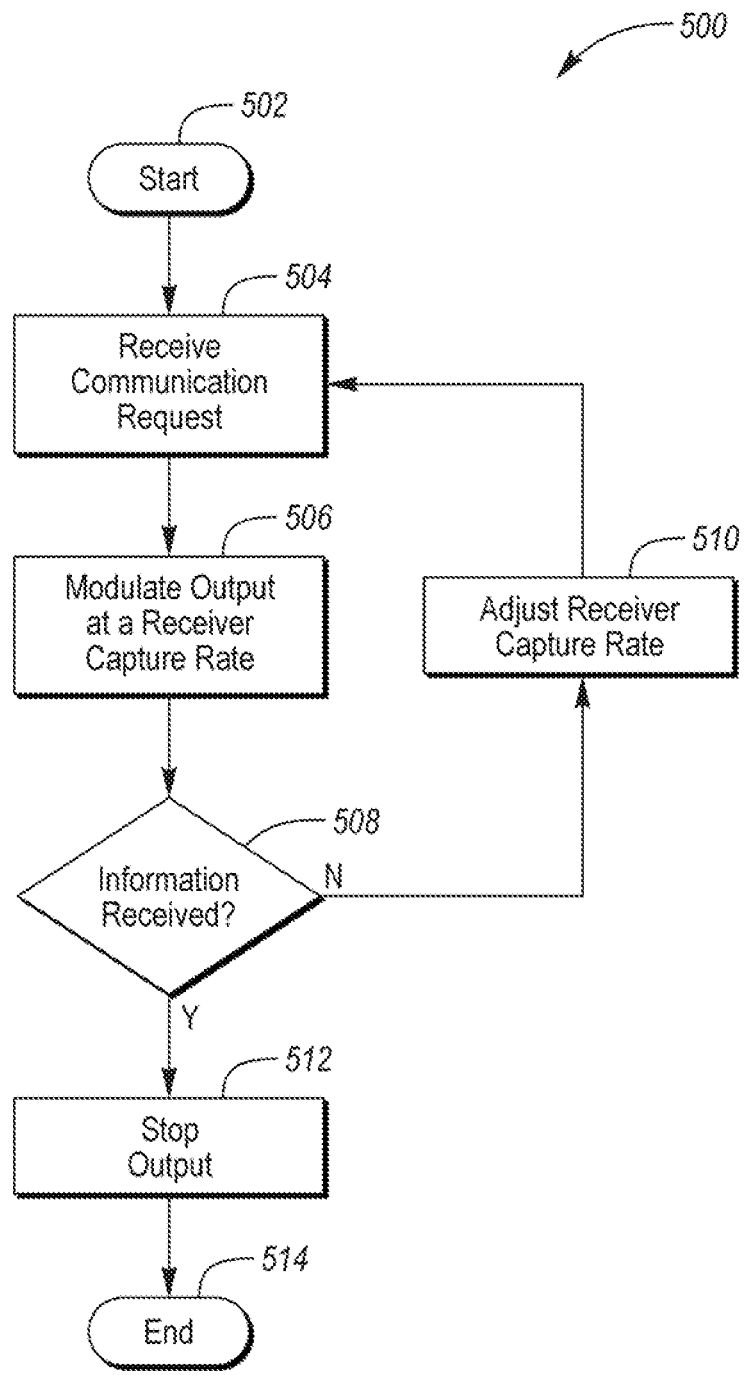
FIG. 5 is an algorithm for sending an electromagnetic signal from a transmitter associated with a control interface.

Referring to FIG. 5, an algorithm 500 for modulating an output is shown. The algorithm starts in step 502. It should be appreciated that any algorithms disclosed herein may be implemented with steps omitted or occurring in a different sequence than shown. The algorithms may continuously repeat or sporadically stop. In step 504, the controller 106 receives a communications request. A vehicle operation may initiate a communications request. For example, an engine start or system startup sequence may initiate the request so that all interfaces having such capabilities attempt to communicate. Meaning, the powering of additional devices may initiate the request. The request may be initiated based on a mobile device request. For example, a digital communications connection between the mobile device 120 and the vehicle 100 may enable the mobile device operator to request all of the interfaces to start transmitting. An application on the mobile device 120 may allow the operator to initiate the request. The request may be cryptographically signed for authenticity.

In step 506, the controller 106 modulates the transmitter 104 output at the receiver capture rate. The receiver capture rate may be communicated from the mobile device 120 prior to transmission or be predefined. The modulation may ensure that the data send rate is the same as the rolling shutter rate, as shown in FIG. 3. In step 508, the controller 106 may receive indication from the mobile device 120 that information was properly received or an indication that it was not. If information was not received, the mobile device 120 may update and send a receiver capture rate to the controller 106 or the controller 106 may increment or decrement the modulation frequency to try communications again in step 510. In step 512, the controller 106 may stop output of the transmitter 104. In step 514, the algorithm 500 may end or repeat.

Figure 6:
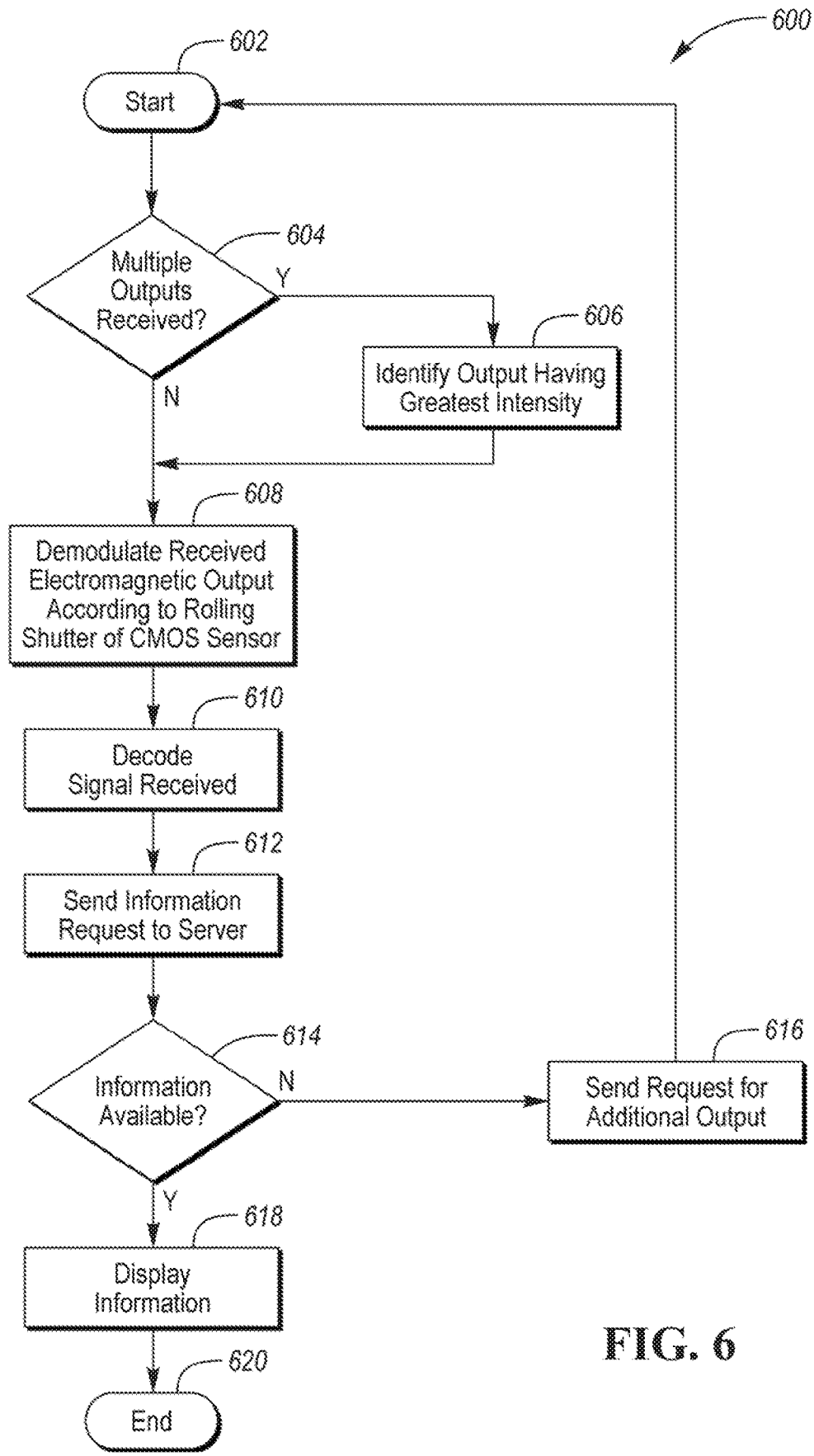
FIG. 6 is an algorithm for displaying interface information on a mobile device.

Referring to FIG. 6, an algorithm 600 is shown. The algorithm 600 starts in step 602. In step 604, the controller 124 determines whether multiple transmitter 104 outputs were received based on the intensity of signals and clustering of the signal magnitude according to the segment of the CMOS sensor 126 being read during the rolling shutter of the frame. The section of the segment of the CMOS sensor 126 is selected in step 606 and used for further communications. In a similar way sections of the segment may be selected to identify multiplexing or other technology. In step 608, the output is demodulated by the controller 124 according to the rolling shutter of the CMOS sensor such that data is received by the controller 124. The data may be stored in local memory to be sent offboard. The output signal may be decoded in step 610. In step 612, an information request may be sent to a server or data repository on the mobile device 120, vehicle 100, or at another location to provide information to the operator. If information is obtained and available in step 614, the information is displayed for the operator in step 618. The information may be displayed on a display 122 of the mobile device 120, another display associated with the vehicle 100, or a separate display. If information is not available in step 614, the controller 124 may send an additional request for output 616 with updated data rates or information to properly identify the interface or provide information about the interface. It should be appreciated that any type of data may be communicated. The data communicated may merely identify the interface. The data communicated may otherwise provide any or all of the information related to that interface including maintenance instructions, operation instructions, definitional information, instructional information, or any other information related to the interface.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
 a vehicle interface including an electromagnetic transmitter and operable to receive tactile user input for control of a system of the vehicle; and
 a controller configured to,
  receive, via a digital connection, a communication request and a receiver capture rate from a nomadic device,
  responsive to the communication request, modulate output at the electromagnetic transmitter having ultraviolet or infrared spectrum wavelength at the receiver capture rate,
  encode the output into data corresponding to the electromagnetic transmitter of the interface, wherein the controller modulates the output to multiplex the data such that a plurality of data streams are transmitted by the transmitter and wherein the plurality of data streams have different wavelengths, and wherein the receiver capture rate is a speed of a rolling shutter of a sensor configured to receive the output, and
  responsive to receiving indication from the nomadic device that information was not properly received, obtain an updated receiver capture rate from the nomadic device via the digital connection, and adjust the modulation using the updated receiver capture rate.

2. The vehicle of claim 1, wherein the interface is a button.

3. The vehicle of claim 1, wherein the interface is a touchscreen.

4. The vehicle of claim 1, wherein the request is initiated by an engine start or system startup routine.

5. The vehicle of claim 1, wherein the output is outside of a visible light spectrum.

6. A method for a mobile device comprising:
by a controller, sending a capture rate of a sensor defined by the mobile device to a vehicle via a digital connection,
receiving an electromagnetic output being modulated according to the capture rate of the sensor, the electromagnetic output having a wavelength within an ultraviolet or an infrared spectrum,
demodulating the electromagnetic output according to a rolling shutter of a sensor of a nomadic device,
identifying a data stream with identification of a control interface associated with a transmitter of the electromagnetic output based on the rolling shutter, wherein the controller modulates the output to multiplex the data stream such that a plurality of data streams are transmitted by a transmitter and wherein the plurality of data streams have different wavelengths,
displaying, on a graphical user interface, information related to the control interface based on the identification such that operation of the control interface is presented, and
responsive to detecting that information was not properly received, updating and sending an updated receiver capture rate to the vehicle.

7. The method of claim 6, wherein the sensor includes complementary metal-oxide-semiconductors.

8. The method of claim 6 further comprising, demultiplexing the electromagnetic output according to wavelength-bands.

9. The method of claim 6 further comprising, responsive to receiving a plurality of electromagnetic outputs having wavelengths within an ultraviolet or an infrared spectrum, selecting the electromagnetic outputs having the highest intensity of the electromagnetic outputs such that only information associated with the one is displayed.

10. The method of claim 6 further comprising,
capturing image frames using the sensor while receiving the electromagnetic outputs;
stitching the image frames together to generate an image representative of the control interface associated with a transmitter from which the electromagnetic output is received; and
displaying the image on the graphical user interface.

* * * * *